UNITED STATES PATENT OFFICE.

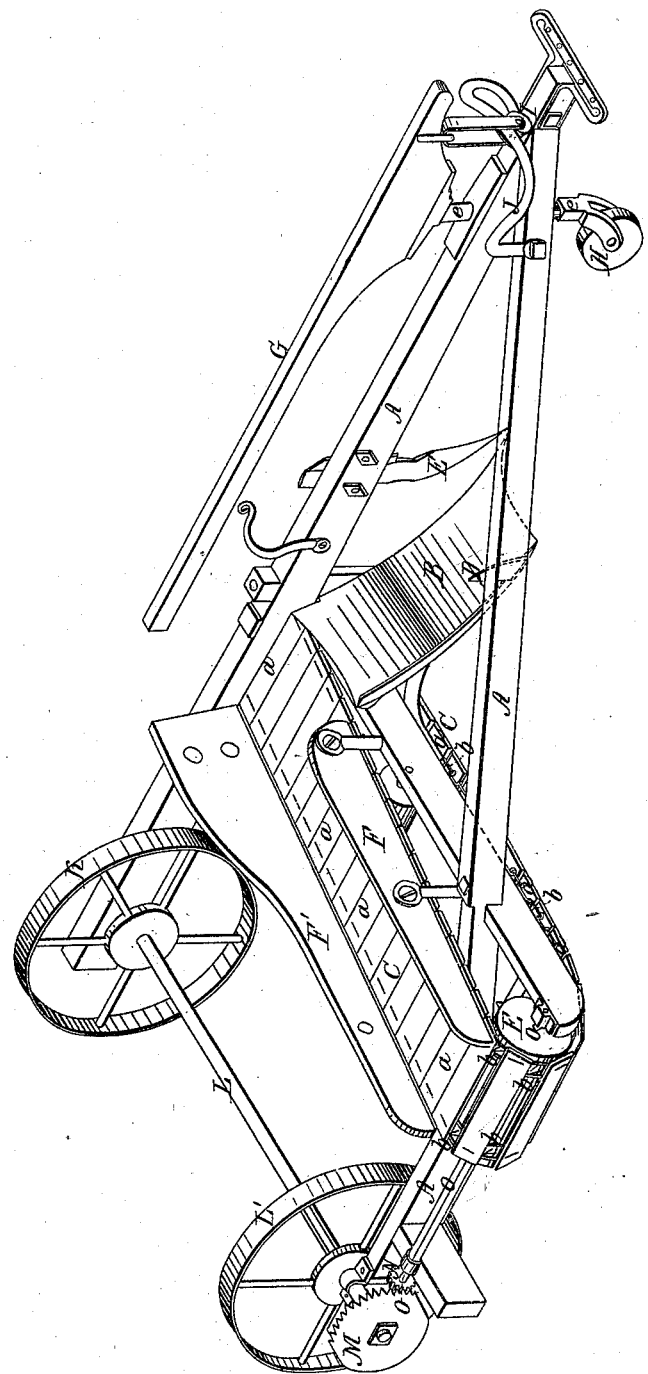

JOHN LYON, OF HARRISBURG, IOWA.

DITCHING-PLOW.

Specification of Letters Patent No. 11,382, dated July 25, 1854.

*To all whom it may concern:*

Be it known that I, JOHN LYON, of Harrisburg, in the county of Van Buren and State of Iowa, have invented a new and useful arrangement of mechanism so as to constitute a machine for throwing up embankments in forming roads and foundations for fences and also for making open drains, &c.; and I do hereby declare that the following is a full, clear, and exact description of the same, reference being had to the accompanying drawing, forming part of this specification.

The drawing represents an isometrical perspective view of the machine, as completed and ready for commencing the ditching operation.

The nature of my invention consists:—In a new and useful arrangemnt of mechanism, so as to constitute a machine for throwing up embankments in forming roads and foundations for fences; and for making open drains, &c.—said arrangement rendering the machines very simple, cheap, and durable; and also very perfect in its operation.

To enable others skilled in the art to make and use my invention, I will proceed to describe its construction and operation.

A, A', designate a triangular shaped frame, to which all the operative mechanism is attached, as shown in the drawing.

B, is the ditching plow. It is attached to the beam, A', of the frame, A, in a similar manner as a common plow. Its construction is also similar to that of an ordinary plow, except the mold board, which is so shaped, that, instead of turning a furrow over, it merely passes under the soil, and raises it to a sufficient inclination to cause it to be deposited upon an endless conveyer, C, as fast as it is cut up. The said mold board has one of its side edges raised slightly higher than the other, so that the dirt will always clear the frame, A', and fall upon the endless conveyer.

D, E, are two cutters; one attached to the beam A', as commonly, and the other to the extremity of the share, and opposite to the land side; these cutters facilitate the entrance of the plow into the soil.

C, is the endless conveyer, placed behind, and at right angles to the land side of the plow. It is composed of slats, a, a, attached to two endless chains, b, b, as shown in the drawing, and is thus made flexible. This conveyer is placed over a plain revolving roller at one end, and a toothed or sprocket roller, E, at the other end, and revolves on the same, in a manner similar to an endless chain horse power.

F, F', are two guide boards for confining the dirt on the endless conveyer—one being on the rear edge, and the other on the front. The front guide, F, extends from the inner side of the plow to the center of the sprocket wheel, and F', extends from one end of the apron to the other, and has that portion which is directly behind the plow, made higher than the other part, so that the plow may not throw the earth over the back edge of the apron. By this conveyer, the dirt is taken from the plow, and deposited in the place desired, either for the purpose of forming a road or foundations for fences. By thus receiving the dirt, and depositing it at right angles to the plow, I am enabled to form a road of any length, and with great ease and despatch.

G, is the lever which carries the guide pulley, H, that is secured in the lower end of a vertical rod, which passes loosely through the beam, A', of the frame, A, and connects with said lever. The extreme end of the lever, G, carries a friction roller, I, which plays under and around a curved way, J, as the lever is turned in the path of a horizontal circle, and for transmitting the power of the lever to the beam, A', in raising the plow share. By raising or lowering this lever, the plow can be adjusted, so as to cut more or less deep, and by moving it horizontally, the machine can be guided up to a steep bank as the team walks along the base.

K, is a driving wheel, arranged fast on the revolving shaft, L—said shaft being some distance in the rear of the dirt conveyer, and revolves at right angles to the conveyer. L', is a sustaining wheel turning loosely on the said shaft, L, near its extremity.

M, is a bevel wheel, placed on the extreme end of the shaft, L. This wheel gears into a pinion, N, on the shaft, O, of the sprocket roller, E, as shown in the drawing—said pinion transmits motion from the driving wheel to the endless conveyer.

The operation is as follows:—As the machine advances, the plow enters the ground, and raises the soil which is forced, as the operation proceeds, upon the endless conveyer and carried by the same as it revolves at right angles to the line of travel, and discharged at the end of the conveyer, in a continuous stream.

What I claim as my invention, and desire to secure by Letters Patent, is:—

The arrangement of the several parts substantially as herein described, for the purpose of constituting a machine which is capable of cutting any depth of furrow, and of taking up the loose dirt or soil out of said furrow or ditch, as fast as it is formed, and convey and discharge it at right angles to the furrow or ditch in a continuous stream, for the purpose of forming roads and foundations for fences, and for other purposes, substantially as herein described.

JOHN LYON.

Witnesses:
J. J. CANFIELD,
J. M. CANFIELD.